United States Patent Office 3,110,703
Patented Nov. 12, 1963

3,110,703
FLAME-RESISTANT SPIROBI(META-DIOXANE) POLYMERS
Howard R. Guest, Charleston, Ben W. Kiff, Ona, and Calvert B. Halstead, St. Albans, W. Va., assignors to Union Carbide Corporation, a corporation of New York
No Drawing. Filed Aug. 29, 1958, Ser. No. 757,898
13 Claims. (Cl. 260—88.3)

This invention relates to a new class of compounds derived from 3,9-dialkenylspirobi(meta-dioxane) derivatives. In a particular aspect, this invention relates to resins containing spirobi(meta-dioxane) groups and chemically-bound phosphorus.

Resins formed by the polymerization of unsaturated spirobi(meta-dioxane) derivatives with polyols have many properties which make them commercially attractive. They are hard and tough and can be made with good clarity and color. However, in common with most other organic plastic materials commercially available, they suffer the disadvantage of being flammable. In many applications, particularly in the structural field, there would be great advantage in having strong, tough, rigid plastics with excellent weatherability characteristics which at the same time were flame-resistant.

A conventional method of reducing the flammability of a plastic is to incorporate mechanically a phosphorus-containing plasticizer into the plastic by milling or other similar operation. Considerable quantities of such plasticizers are required to produce this flame-resistance property in the plastic. Usually the plasticizer modifies other properties of the plastic in a beneficial way at the same time. Plasticizers of this type include compounds such as tricresyl phosphate and trioctyl phosphate.

This method of reducing the flammability of plastics with phosphorus-containing plasticizers is not practical for polymers produced from spirobi(meta-dioxane) derivatives. These polymers are not compatible with many of the phosphorus-containing plasticizers, and when proper compatibility between the polymers and plasticizers is accomplished it is found that many of the desirable properties of the polymers are adversely affected. Further, no additive is known which can be mixed mechanically with spirobi(meta-dioxane) polymers to produce flame-resistant compositions.

It is a main object of this invention to provide flame-resistant spirobi(meta-dioxane) polymers and a process for their preparation. Other objects and advantages of this invention will become apparent to those skilled in the art from the accompanying description and disclosure.

Accordingly, flame-resistant polymers are produced by interpolymerizing a 3,9 - dialkenylspirobi(meta-dioxane) derivative with an aliphatic polyhydric alcohol and "condensed" phosphoric acids. The polymers so produced contain chemically-bound phosphorus as a substantive part of the polymers.

The 3,9-dialkenylspirobi(meta-dioxane) derivatives contemplated are those having an alkenyl substituent in the three-position and in the nine-position which contains between two and about eighteen carbon atoms. The alkenyl substituents in the spirobi(meta-dioxane) derivative can be identical or they can be different. These spirobi acetals can also be designated as 3,9-dialkenyl-2,4,8,10-tetraoxa-spirobi(5.5)undecane. A particularly useful group of these unsaturated spirobi acetal compounds are those derived from the reaction of acrolein and substituted acroleins with pentaerythritol. Such unsaturated acetals may be represented by the formula:

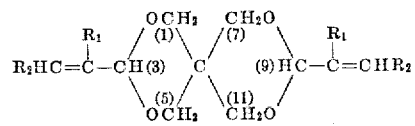

wherein $R_1$ is hydrogen, methyl or chlorine, and $R_2$ is hydrogen or methyl.

Unsaturated spirobi acetals which correspond to the formula include:

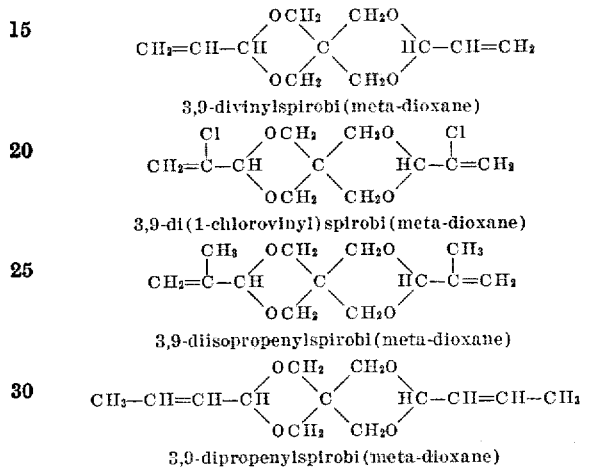

Unsaturated spirobi(meta-dioxane) derivatives are readily prepared by the condensation of a mole of pentaerythritol with two moles of an unsaturated aldehyde or ketone, or mixtures thereof, in the presence of an acid catalyst such as p-toluenesulfonic acid. The following reaction schemes are particular illustrations of the general synthetic method. When acrolein is employed, an unsubstituted 3,9-divinylspirobi(meta-dioxane) is obtained:

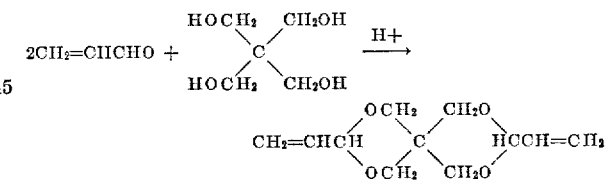

When the condensation is conducted with an unsaturated ketone then the three- and nine-positions of the spirobi (meta-dioxane) nucleus obtained have two substituents rather than one:

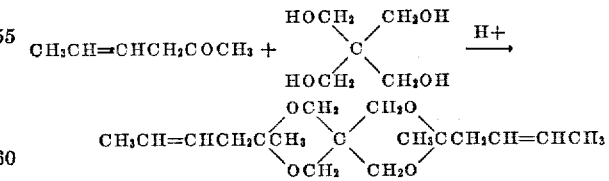

It is not necessary that the unsaturated aldehyde or ketone reacted with pentaerythritol be pure or a single species. Mixtures of unsaturated aldehydes and/or ketones may be condensed with pentaerythritol. The resulting products are mixtures of 3,9-(olefinically-substituted)spirobi(meta-dioxane) compounds which may be resolved into pure components or which may be used as crude mixtures directly in polymerization reactions.

By "condensed" phosphoric acids as used herein is meant the group of acids which are commonly represented by the formula:

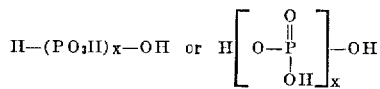

wherein X is greater than 1.

The simplest member of this class is pyrophosphoric acid, $H_4P_2O_7$. A mixture of "condensed" phosphoric acids is prepared by mixing together about 2 to 3 parts by weight of ortho-phosphoric acid ($H_3PO_4$) with one part of phosphorus pentoxide ($P_2O_5$) and heating the mixture at a temperature between about 80° C. and 120° C. for a period of time between about ten and thirty minutes. "Condensed" phosphoric acids have free hydroxyl groups

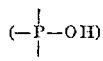

which are capable of cross-linking with unsaturated spirobi acetals.

The aliphatic polyhydric alcohols contemplated to be employed as a comonomer in the formation of the flame-resistant polymers are those alcohols containing two or more hydroxyl groups which are reactive with 3,9-dialkenylspirobi(meta-dioxane) derivatives and which do not contain other functional groups which interfere with the polymerization reaction. The aliphatic polyhydric alcohols which are useful include aliphatic diols such as ethylene glycol, propylene glycol, butylene glycol, 1,4-butanediol, 1,6-hexanediol, 2-ethylhexane-1,3-diol; polyalkylene glycol derivatives such as diethylene glycol, triethylene glycol, pentaethylene glycol, dipropylene glycol, tripropylene glycol, and the like; aliphatic triols such as glycerol, 1,2,4-butanetriol, trimethylolethane, trimethylolpropane; and higher polyols such as pentaerythritol, sorbitol, mannitol, dulcitol, 2,4-dihydroxy-1,3-hydroxymethylpentane, and the like.

The reaction for producing flame-resistant spirobi(meta-dioxane) polymers can be conducted by the simple expediency of heating a mixture of 3,9-dialkenylspirobi-(meta-dioxane), aliphatic polyhydric alcohol and "condensed" phosphoric acids at a temperature between about 60° C. and 150° C. The polymerization may require a reaction period of twenty-four hours or longer at the lower reaction temperatures, and a reaction period as short as twenty minutes may be satisfactory to complete the curing of the polymer product at the higher temperatures.

The relative concentrations of the reactants can be varied over a wide range in producing the flame-resistant resins. For example, pentaerythritol has four hydroxyl groups (tetrafunctional) and 3,9-dialkenylspirobi(meta-dioxane) has two double bonds (difunctional) so that the theoretical combining ratio is two moles of 3,9-dialkenylspirobi(meta-dioxane) for every mole of pentaerythritol. Resins with desirable properties can be produced over the range of between one mole and three moles of 3,9-dialkenylspirobi(meta-dioxane) for every mole of pentaerythritol. Generally, it is practical to use not less than two moles of 3,9-dialkenylspirobi(meta-dioxane) for each mole of pentaerythritol reacted. Preferably, a quantity of 3,9-dialkenylspirobi(meta-dioxane) is employed which is equivalent in functionality to the total amount of polyhydric alcohol and "condensed" phosphoric acids with which it is copolymerized. As mentioned previously, the "condensed" phosphoric acids have free hydroxyl groups which react with olefinic groups during the polymerization reaction.

The quantity of "condensed" phosphoric acids employed is not narrowly critical. The preferred range is between about 10 and 25 percent by weight, based on the total weight of 3,9-dialkenylspirobi(meta-dioxane), aliphatic polyhydric alcohol and "condensed" phosphoric acids being reacted. Quantities less than about 10 percent by weight can be incorporated into the compositions but it has been found in many cases that the resins containing these lesser quantities of "condensed" phosphoric acids support combustion and are not self-extinguishing. Similarly, quantities of "condensed" phosphoric acids in excess of about 20 percent by weight can be employed if desired. However, such larger quantities of "condensed" phosphoric acids do not appreciably increase the flame-resistance of the resins and they may deleteriously affect other characteristics of the resins.

Although the "condensed" phosphoric acids are acidic in nature and can act as a catalyst, it is more convenient to conduct the polymerization reaction in the presence of an acidic curing catalyst to promote a reasonable reaction rate. Satisfactory curing catalysts include acidic catalysts such as sulfuric acid, toluenesulfonic acid, benzenesulfonic acid, boron trifluoride, aluminum chloride, diethyl sulfate, dimethyl sulfate, diisopropyl sulfate, titanium tetrachloride, phenyl acid phosphate and octylphenyl acid phosphate. Curing catalyst concentrations can vary from as little as 0.1 weight percent for the more active catalysts, up to 1.0 weight percent or more for the less active catalysts, based on the weight of reactants.

In another method found convenient for preparing flame-resistant polymers, an unsaturated aldehyde or ketone, such as acrolein, is reacted with pentaerythritol in stoichiometric quantities calculated from the reciprocal of their functionalities (e.g., 3 moles of pentaerythritol to 4 mols of acrolein) to produce a liquid pre-condensate A-stage resin in the presence of an acid catalyst. The pre-condensate polymerization reaction is conducted at a temperature between about 60° C. and 100° C. for a period of time between one-half hour and five hours depending on the viscosity desired for the A-stage resin. After the unreacted materials and water of reaction are removed by distillation, the A-stage resin is usually a viscous liquid which slowly condenses to a solid plastic on standing. For practical purposes, the condensation can be stopped by neutralization or removal of the catalyst. The neutral liquid A-stage resin can be stored until needed.

Flame-resistant polymers are prepared from the liquid resin condensate by mixing a calculated quantity of "condensed" phosphoric acids into the said liquid resin and heating the mixture until complete curing is obtained. A curing catalyst is also added to the mxiture prior to the polymerization reaction, unless the catalyst employed for preparing the liquid resin condensate is still present in the mixture in a sufficient quantity to promote the formation of a cured flame-resistant resinous product. This final cure can be accomplished at the same temperature used for the formation of the intermediate liquid resin, or at higher temperatures such as between 100° C. and 150° C.

The flame-resistant spirobi(meta-dioxane) polymers of this invention can be employed to produce molded articles, laminates, or any product for which other thermosetting resins are used. They can be cured in any desirable shape or form. These polymers have the advantage of being self-extinguishing when ignited, besides being strong, tough and rigid.

These flame-resistant polymers also have the advantage over many other thermoset resins in that they cured without the formation of volatile by-products, such as water, and there is little or no shrinkage during the curing process.

The following examples will serve to illustrate specific embodiments of this invention.

Example 1

An acrolein-pentaerythritol resin was prepared as follows: A charge of 29.8 pounds of 95.5 percent acrolein (0.508 pound-mole), 41.6 pounds pentaerythritol (0.306 pound-mole) and 112 grams of 37 percent hydrochloric acid dissolved in 3.8 pounds of water was introduced into a glass-lined reaction vessel. The mixture was heated at a temperature of 70° C. to 76° C. for a reaction period of fifty-two minutes, and at the end of the reaction time unreacted acrolein and water were distilled off to a kettle temperature of 75° C. at a pressure of 4 millimeters of mercury.

To 150 grams of the liquid A-stage resin condensate thus produced, there was added 0.45 gram of mixed alkanesulfonic acids. This material was cured in the form of thin bars for a period of eight hours at a temperature of 100° C. One of these bars was ignited with a torch and it burned briskly at the rate of 4 inches of length per minute.

A mixture of "condensed" phosphoric acids was prepared by heating together ortho-phosphoric acid (15.7 grams) and phosphorus pentoxide (6.5 grams) at a temperature of 100° C. for a period of fifteen minutes. This mixture was added to 90 grams of the A-stage resin prepared above along with 0.45 gram of diethyl sulfate. Thin bars were prepared from the resin by curing for a period of two hours at a temperature of 100° C. These bars would not burn even though repeated attempts were made to ignite them with a torch. This resin contained approximately 20 percent "condensed" phosphoric acids by weight, based on the total weight of resin.

Example 2

A mixture of "condensed" phosphoric acids was prepared by heating ortho-phosphoric acid (11.8 grams) with phosphorus pentoxide (4.9 grams) at a temperature of 100° C. for a period of fifteen minutes. This prepared catalyst was mixed with 90 grams of the A-stage resin from Example 1. After the addition of 0.55 gram of diethyl sulfate, the material was cured in the form of thin bars for a period of twenty-one hours at a temperature of 100° C. The cured bars did not burn even though repeated efforts were made to ignite them with a torch. This resin contained approximately 15 percent "condensed" phosphoric acids by weight, based on the total weight of resin.

Example 3

A mixture of "condensed" phosphoric acids was made by heating ortho-phosphoric acid (9.4 grams) with phosphorus pentoxide (3.9 grams) at a temperature of 100° C. for a period of fifteen minutes. This was added to 90 grams of the A-stage resin prepared in Example 1 to form a mixture containing approximately 12.8 percent of the "condensed" phosphoric acids. After the addition of 0.45 percent of diethyl sulfate, the mixture was cured into thin bars by heating for nineteen hours at a temperature of 100° C. The bars did not burn even though repeated efforts were made to ignite them with a torch.

What is claimed is:

1. A curable composition comprising pentaerythritol, between about 10 and 25 percent by weight of "condensed" phosphoric acids having the formula $H—(PO_3H)_x—OH$, wherein $x$ is an integer greater than one, and 3,9-dialkenylspirobi(meta-dioxane) having between two and eighteen carbon atoms in each alkenyl radical.

2. A curable composition comprising pentaerythritol, between about 10 and 25 percent by weight of "condensed" phosphoric acids having the formula $H—(PO_3H)_x—OH$, wherein $x$ is an integer greater than one, and 3,9-divinylspirobi(meta-dioxane).

3. A curable composition comprising pentaerythritol, between about 10 and 25 percent by weight of "condensed" phosphoric acids having the formula $$H—(PO_3H)_x—OH$$

wherein $x$ is an integer greater than one, and 3,9 dipropenylspirobi(meta-dioxane).

4. A curable composition comprising pentaerythritol, between about 10 and 25 percent by weight of "condensed" phosphoric acids having the formula $H—(PO_3H)_x—OH$, wherein $x$ is an integer greater than one, and 3,9-diisopropenylspirobi(meta-dioxane).

5. A curable composition comprising pentaerythritol, between about 10 and 25 percent by weight of "condensed" phosphoric acids having the formula $H—(PO_3H)_x—OH$, wherein $x$ is an integer greater than one, and 3,9-di(1-chlorovinyl)spirobi(meta-dioxane).

6. A curable composition comprising an aliphatic polyhydric alcohol, between about 10 and 25 percent by weight of "condensed" phosphoric acids having the formula $H—(PO_3H)_x—OH$, wherein $x$ is an integer greater than one, and 3,9-dialkenylspirobi(meta-dioxane) having between two and eighteen carbon atoms in each alkenyl radical.

7. A process for preparing flame-resistant resins which comprises heating at reaction temperature an aliphatic polyhydric alcohol, between about 10 and 25 percent by weight of "condensed" phosphoric acids, and 3,9-dialkenylspirobi(meta-dioxane) having between two and eighteen carbon atoms in each alkenyl radical.

8. A process for preparing flame-resistant resins which comprises heating at reaction temperature pentaerythritol, between about 10 and 25 percent by weight of "condensed" phosphoric acids, and 3,9-divinylspirobi(meta-dioxane) in contact with an acidic catalyst.

9. The process of claim 8 wherein the acidic catalyst is a dialkyl sulfate.

10. The process of claim 9 wherein the dialkyl sulfate is diethyl sulfate.

11. A process for preparing flame-resistant resins which comprises heating at reaction temperature a liquid resin condensate of acrolein and pentaerythritol with between about 10 and 25 percent by weight of "condensed" phosphoric acids having the formula $H—(PO_3H)_x—OH$, wherein $x$ is an integer greater than one, in contact with an acidic catalyst to form a solid polymer.

12. A curable composition comprising between about 10 and 25 percent by weight of "condensed" phosphoric acids having the formula $H—(PO_3H)_x—OH$, wherein $x$ is an integer greater than one, and a liquid resin condensate of acrolein and pentaerythritol.

13. The composition of claim 6 cured at a temperature between 60° C. and 150° C.

References Cited in the file of this patent

UNITED STATES PATENTS

| | | |
|---|---|---|
| 2,464,342 | Pollak | Mar. 15, 1949 |
| 2,870,121 | Kraft | Jan. 20, 1959 |

OTHER REFERENCES

Encyclopedie of Chemical Technology, vol. 10, page 411 (Interscience).

UNITED STATES PATENT OFFICE
CERTIFICATE OF CORRECTION

Patent No. 3,110,703                      November 12, 1963

Howard R. Guest et al.

It is hereby certified that error appears in the above numbered patent requiring correction and that the said Letters Patent should read as corrected below.

Column 6, lines 32 and 38, after "acids", each occurrence, insert -- having the formula $H-(PO_3H)_x-OH$, wherein x is an integer greater than one --.

Signed and sealed this 28th day of April 1964.

(SEAL)
Attest:

ERNEST W. SWIDER

Attesting Officer

EDWARD J. BRENNER

Commissioner of Patents